Sept. 2, 1924.　　　　　　　　　　　　　　1,506,930
M. R. HASELMAIER
DISK BRAKE FOR VEHICLE WHEELS
Filed Aug. 30, 1923　　　2 Sheets-Sheet 2

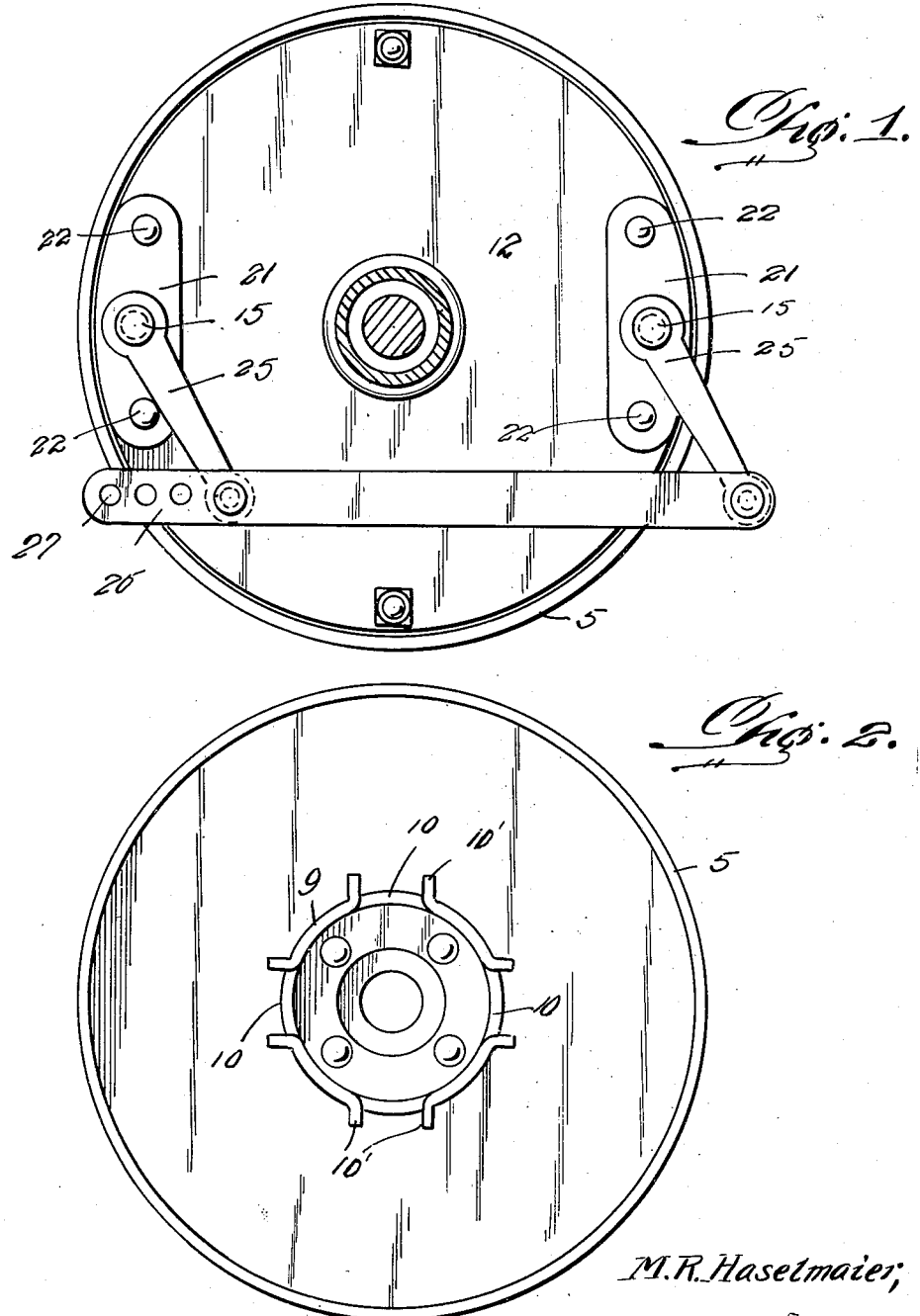

M. R. Haselmaier,
Inventor

Patented Sept. 2, 1924.

1,506,930

UNITED STATES PATENT OFFICE.

MAURICE R. HASELMAIER, OF MOUNT VERNON, ALABAMA.

DISK BRAKE FOR VEHICLE WHEELS.

Application filed August 30, 1923. Serial No. 660,097.

*To all whom it may concern:*

Be it known that I, MAURICE R. HASELMAIER, a citizen of the United States, residing at Mount Vernon, in the county of Mobile and State of Alabama, have invented certain new and useful Improvements in Disk Brakes for Vehicle Wheels, of which the following is a specification.

The primary object of my invention resides in the provision of a brake for the wheels of vehicles wherein the same comprises a disk element that is operatively connected to the wheel together with a pair of normally inoperative friction disks, means being provided for forcing said friction disks into engagement with the movable disk which will result in the positive braking of the wheels.

An additional object of my invention is the provision of such a brake construction for vehicle wheels that is extremely simple of construction and of such a nature as to be applied to practically all types of wheels now employed in conjunction with vehicles, the device comprising relatively few parts and these so co-related as to reduce the possibility of disarrangement to a minimum.

A still further object of the invention is to provide such a disk brake for vehicle wheels that may be readily disassembled for repair or renewal purposes.

With the above and other objects in view as the nature of the invention is better understood, the same comprises the novel form, combination and arrangement of parts set forth in the following specification, shown in the accompanying drawings, and claimed.

Figure 3:
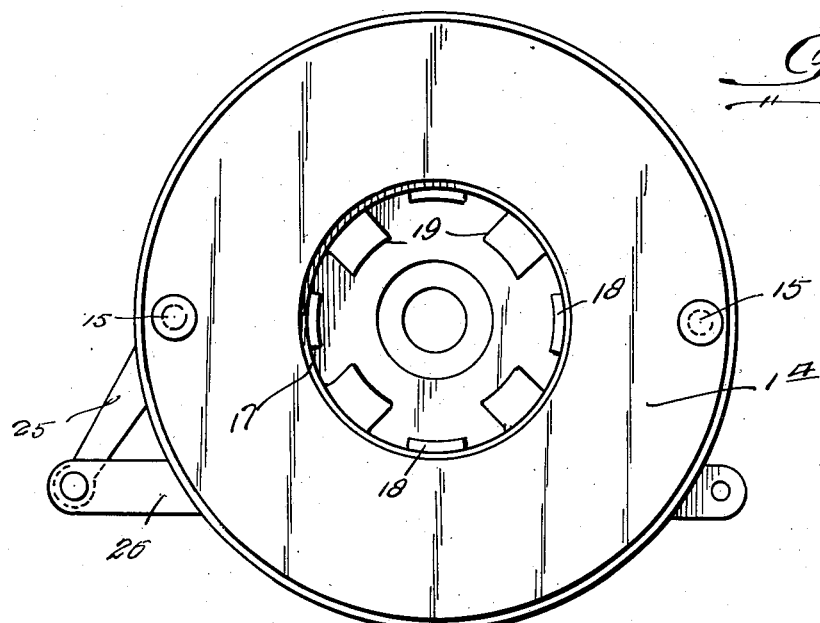
Figure 4:
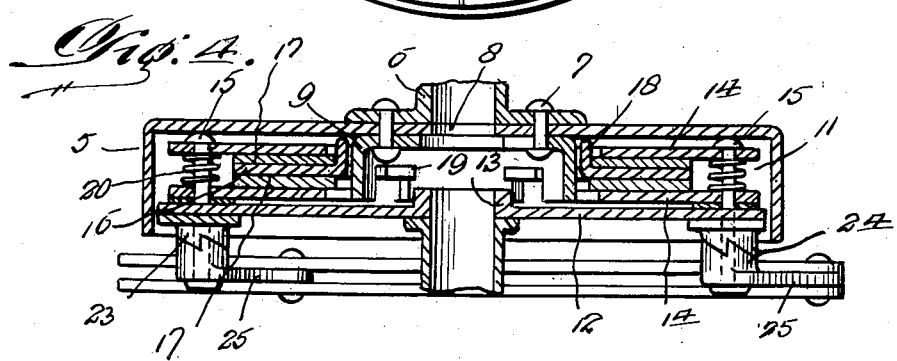
Figure 5:
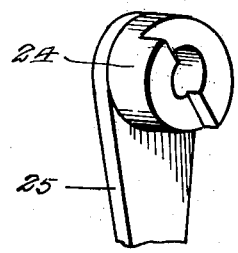

In the drawings wherein like reference characters indicate corresponding parts throughout the several views, Figure 1 is an elevational view of one side of my improved brake structure, Figure 2 is a similar view with certain parts of the structure removed, Figure 3 is an elevational view of the braking mechanism per se removed from its casing, Figure 4 is a detailed longitudinal section of my improved brake, and Figure 5 is a fragmentary perspective of one of the cam arms employed in conjunction with the present invention and affording a means for pressing the pair of normally inoperative friction disks against the disk element that rotates with the vehicle wheel.

Now having particular reference to the drawings, my novel disk brake embodies the provision of a circular pan-shaped housing 5 that is secured to the inner side of the vehicle wheel designated 6 and being shown fragmentarily through the medium of rivets or other suitable fastening means 7, this casing being formed with a central opening 8 for allowing the axle to extend therethrough.

Within the casing 5 and secured thereto through the medium of the before mentioned rivets 7 is a circular cup-shaped member 9 that is also provided with a central circular opening for permitting of the passage of the axle therethrough. As more clearly shown in Figure 2 the skirt portion of this cup-shaped element 9 is provided at spaced points thereon with notches 10 these notches being afforded by splitting the skirt portion at spaced points thereon both circumferentially and laterally and bending the material at opposite sides of the lateral splits outwardly for providing upstanding lugs 10'.

Adapted to be removably positioned within the casing 5 is the braking mechanism per se which is designated generally 11, this braking mechanism comprising an outer disk member 12 formed with a central opening 13 co-extensive with the openings in said casing 5 and the cup-shaped element 9. Upon the inner side of this disk 12 is a pair of spaced plates 14 that are formed centrally with relatively large openings, these plates 14 being secured to the before mentioned disk 12 through the medium of a pair of relatively elongated pins 15 that are headed at their opposite ends. Between these plates 14, 14 is a relatively smaller plate 16 that is separated from the plates 14, 14 by a pair of friction disks 17, 17. These friction disks 17, 17 as well as the plate 16 being of relatively smaller size than the before mentioned disks 14, 14 and being also formed with relatively large circular openings for permitting of the engagement of the cup-shaped element 9 therethrough. The inner edge of the disk 16 is formed at spaced points thereon with outwardly extending pairs of slits whereby the material between these slits may be bent upwardly for providing lugs 18, the material between these lugs affording inwardly extending fingers 19 that engage within the before mentioned notches 10 of the cup-shaped member 9 whereby when the casing 5 and this cup-shaped member 9 rotates the disk 16 will have a similar rotary movement therewith.

Surrounding the before mentioned pins 15 between the elements 14, 14 are expansion springs 20 that serve as a means for normally maintaining these elements separated and allowing the disk 16 to rotate without being engaged by the friction disks 17, 17.

Upon the outer face of the plate 12 and at diametrically opposite points thereon are bracket plates 21, these bracket plates being secured to said plate 12 through the medium of rivets or other suitable fastening means 22. Surrounding openings formed intermediate the ends of each of these bracket plates 21 is a spiral cam lug 23 it being apparent that the before mentioned pins 15 extend outwardly through these lugs as more clearly shown in Figure 4. Disposed for swinging movement upon the outer ends of these pins 15 are other spiral cam lugs 24 that are complementary to the spiral lugs 23 these latter mentioned lugs 24 being carried by the upper ends of arms 25 which arms are inter-connected through the medium of a relatively elongated pair of links 26 which are formed at one end with a series of openings 27 for adjustment purposes. It is of course to be understood that the said arms 25 are to be pivotally secured between said links 26 and that the front ends of these links are to be operatively connected to the brake pedal of the vehicle.

In view of the above description when considered in conjunction with the accompanying drawings, it will at once be apparent that the brake housing 5 together with the cup-shaped member 9 and central disk 16 will rotate with the wheel. Upon applying pressure to the foot brake of the vehicle, the arms 25 will be swung forwardly for consequently forcing inwardly upon the plate 12 and consequently drawing the elements 14, 14 together for thereby compressing the friction elements 17, 17 upon the rotary plate 16 for thereby stopping the rotation of the wheels.

Even though I have herein set forth the most practical embodiment of the invention with which I am at the present time familiar it is nevertheless to be understood that minor changes may be made within the invention without departing from the spirit and scope of the appended claim.

Having thus described my invention, what I claim as new and desire to secure by Letters Patent, is:—

A friction brake comprising inner and outer flanged members, a flange of the inner member being recessed, a plate having a central opening which receives the inner member, said plate being housed within the outer member, the plate being provided at the edge of the opening therein with radially disposed fingers which extend through the recesses in the flange of the inner member, the plate being provided at the inner edge of its opening and at points between said fingers with angularly disposed lugs which lie at the outer surface of the flange of the inner member, friction disks mounted upon the opposite sides of the said plate beyond the lugs, annular plates disposed at the outer sides of the friction disk, springs interposed between the annular plates and serving to hold them spaced with relation to each other, a disk located within the flange of the outer member and beyond the edge of the flange of the inner member, bolts passing transversely through the last mentioned disk and the friction disk and means mounted upon the last mentioned disk to move the bolts longitudinally and transversely of the friction disks whereby the annular disks are brought into frictional contact with the frictional disks.

In testimony whereof I affix my signature.

MAURICE R. HASELMAIER.